US010150562B2

(12) United States Patent
Hein

(10) Patent No.: US 10,150,562 B2
(45) Date of Patent: Dec. 11, 2018

(54) HYDRAULICALLY PROPELLED DRONE FOR DELIVERING FIREFIGHTING FLUID

(71) Applicant: Kim F. Hein, North Wales, PA (US)

(72) Inventor: Kim F. Hein, North Wales, PA (US)

(*) Notice: Subject to any disclaimer, the term of this patent is extended or adjusted under 35 U.S.C. 154(b) by 335 days.

(21) Appl. No.: 14/997,510

(22) Filed: Jan. 16, 2016

(65) Prior Publication Data
US 2017/0113787 A1 Apr. 27, 2017

Related U.S. Application Data

(63) Continuation-in-part of application No. 14/923,928, filed on Oct. 27, 2015.

(51) Int. Cl.
*B64C 15/02* (2006.01)
*B64C 39/02* (2006.01)
*A62C 31/05* (2006.01)

(52) U.S. Cl.
CPC .......... *B64C 39/022* (2013.01); *B64C 39/024* (2013.01); *A62C 31/05* (2013.01); *B64C 2201/027* (2013.01); *B64C 2201/10* (2013.01); *B64C 2201/12* (2013.01)

(58) Field of Classification Search
CPC ......... B64C 15/00; B64C 15/02; B64C 15/12; B64C 39/022; B64C 39/024; B64C 2201/10; B64C 2201/12; A62C 31/05; A62C 31/24; A62C 31/28; B64D 1/18; B05B 13/005
See application file for complete search history.

(56) References Cited

U.S. PATENT DOCUMENTS

| | | | | | |
|---|---|---|---|---|---|
| 3,381,922 A | * | 5/1968 | Laing | ........................ | B05B 3/18 239/171 |
| 3,700,172 A | * | 10/1972 | Gallegos, Sr. | ......... | A63H 27/06 239/211 |
| 3,759,330 A | * | 9/1973 | Rainey | ..................... | B64D 1/16 169/13 |
| 4,432,736 A | * | 2/1984 | Parramore | ............. | B63H 25/46 440/42 |
| 5,135,055 A | * | 8/1992 | Bisson | ..................... | A62C 3/00 169/53 |
| 7,258,301 B2 | * | 8/2007 | Li | .......................... | A63B 35/00 114/315 |
| 8,336,805 B1 | * | 12/2012 | Zapata | .................. | B64C 39/026 114/315 |
| 9,751,597 B1 | * | 9/2017 | Low | ...................... | B63B 25/002 |

(Continued)

*Primary Examiner* — Medhat Badawi
*Assistant Examiner* — Christopher D Hutchens
(74) *Attorney, Agent, or Firm* — Louise S. Heim

(57) ABSTRACT

A hydraulically propelled drone is provided for delivering firefighting fluid to an elevated location. The drone comprises a housing having a primary inlet configured to receive the distal end of a fire hose, a primary outlet configured to receive the inlet end of a primary nozzle, a central passageway configured to conduct fluid from the primary inlet to the primary outlet, and at least one secondary outlet communicating with the central passageway. At least one lift nozzle communicates with the secondary outlet and is configured to direct fluid in a generally downward direction so as to produce an upward thrust on the drone housing, and at least one valve is contained within the housing and configured to control the flow of said fluid through the primary nozzle and the at least one lift nozzle nozzle.

20 Claims, 6 Drawing Sheets

(56) References Cited

U.S. PATENT DOCUMENTS

| | | | |
|---|---|---|---|
| 2008/0014811 A1* | 1/2008 | Zeyger | B64C 39/026 441/66 |
| 2012/0298789 A1* | 11/2012 | Oz | B64C 15/12 244/12.4 |
| 2013/0134254 A1* | 5/2013 | Moore | B64D 1/16 244/17.11 |
| 2015/0274294 A1* | 10/2015 | Dahlstrom | B64D 1/18 239/722 |
| 2016/0069578 A1* | 3/2016 | O'Donnell | A62C 99/0072 454/341 |
| 2017/0043872 A1* | 2/2017 | Whitaker | B64D 1/18 |
| 2017/0121034 A1* | 5/2017 | Fisher | B64D 47/08 |
| 2018/0022423 A1* | 1/2018 | Low | B64C 39/024 |
| 2018/0043386 A1* | 2/2018 | Busby | B05B 13/005 |

\* cited by examiner

HYDRAULICALLY PROPELLED DRONE FOR DELIVERING FIREFIGHTING FLUID

CROSS REFERENCE TO RELATED APPLICATIONS

This is a continuation-in-part of U.S. patent application Ser. No. 14/923,928, filed Oct. 27, 2015.

FIELD OF THE INVENTION

This invention relates to the field of firefighting equipment.

More specifically, the invention relates to an apparatus for delivering firefighting fluid to an elevated location.

In a further and more specific aspect, the invention concerns a hydraulically propelled drone for delivering firefighting fluid to an elevated location.

BACKGROUND OF THE INVENTION

Firefighting is an extraordinarily dangerous activity. Firefighters are routinely at risk of injuries due to high heat, smoke inhalation, exposure to hazardous materials, structural collapse, and falling debris. As a result, various attempts have been to design firefighting equipment that can be controlled remotely, allowing firefighters to keep a reasonable distance from the hottest, most dangerous regions of a fire zone. For instance, US patent application number US20120285706A1 by McLoughlin et al and U.S. Pat. No. 5,860,479A to LaFollette disclose firefighting nozzles carried by rotatable turrets on tank-like robotic land vehicles that can be sent into areas that are too hazardous for human entry. However, such vehicles have limited value for fires located in high-rise buildings or other locations above ground level.

Aerial firefighting vehicles such as helicopters and air-tankers, or water bombers, have been used to drop water or fire retardant on wildfires, but such vehicles are very expensive and require skilled pilots. Furthermore, they are far better suited for dropping large quantities of water over large, spread out areas, than for aiming streams of water at precise locations.

Unmanned aerial vehicles, also known as UAVs or drones, have been used for taking photographs and gathering data at fire scenes, but not, to date, for extinguishing fires.

Accordingly, there exists a need for a relatively inexpensive and easy-to-operate, remotely controlled apparatus that can transport a firefighting nozzle to an elevated location and aim the nozzle with reasonable accuracy.

SUMMARY

Briefly, to achieve the desired objects of the present invention, a hydraulically propelled drone is provided for delivering firefighting fluid to an elevated location. The drone comprises a housing having a primary inlet configured to receive the distal end of a fire hose, a primary outlet configured to receive the inlet end of a primary nozzle, a central passageway configured to conduct fluid from the primary inlet to the primary outlet, and at least one secondary outlet communicating with the central passageway. At least one lift nozzle communicates with the secondary outlet and is configured to direct fluid in a generally downward direction so as to produce an upward thrust on the drone housing, and at least one valve is contained within the housing and configured to control the flow of said fluid through the primary nozzle and the at least one secondary nozzle.

The primary nozzle preferably has an annular nozzle surface, with spray openings formed 360 degrees around its circumference, so that fluid is emitted in a radial, rather than axial, direction. The radial spray pattern produces force in every direction, resulting in a net force of zero, so there is no recoil or reaction force exerted by the main nozzle on the drone housing and the connected hose.

In a first exemplary embodiment of the invention, the at least one lift nozzle comprises a set of four lift nozzles, including at least one pair of rear lift nozzles and at least one pair of front lift nozzles. Each pair of lift nozzles comprises one lift nozzle located on the left side of the housing and one lift nozzle located on the right side of the housing. The at least one valve comprises a main valve configured to control the flow of fluid between the primary inlet and the primary outlet of the drone housing, plus a set of four secondary valves, wherein each of the secondary valves is configured to control flow through a different one of the lift nozzles.

In this embodiment, each of the rear lift nozzles is angled slightly rearwardly so as to produce a slight forward thrust on the drone housing, and each of the front lift nozzles is angled slightly forwardly so a to product a slight rearward thrust on the drone housing. Similarly, each of the right lift nozzles is angled slightly to the right so as to produce a slight leftward thrust on the drone housing, and each of the left lift nozzles is angled slightly to the left so as to produce a slight rightward thrust on the drone housing.

A control system for operating the primary and secondary valves is located within the drone housing. The control system may be remotely actuated, for instance, by an operator transmitting control signals to an antenna located on or in the drone housing, and may be configured to control each of the valves separately. Thus, to move the drone in a forward direction, an operator could open the valves on the two rear nozzles and close the two front nozzles, thus producing a forward thrust. To move the drone in a rightward direction, an operator could open the valves on the two left nozzles and close the two right nozzles, thus producing a rightward thrust, and so forth.

In another exemplary embodiment of the invention, the lift nozzles are oriented straight downwardly, and a rotatable steering nozzle is provided on top of the drone housing for controlling the horizontal movement of the drone. Flow through, and rotation of, the steering nozzle may be controlled remotely by a firefighter on the ground, while flow through the primary and secondary nozzles is automatically controlled by a central processing unit in response to changes in pressure, orientation, and other variables detected by a sensor board within the drone housing.

BRIEF DESCRIPTION OF THE DRAWINGS

The foregoing and more specific objects and advantages of the instant invention will become readily apparent to those skilled in the art from the following detailed description of the preferred embodiments thereof taken in conjunction with the drawings in which.

DETAILED DESCRIPTION OF AN EXEMPLARY EMBODIMENT

Figure 1:
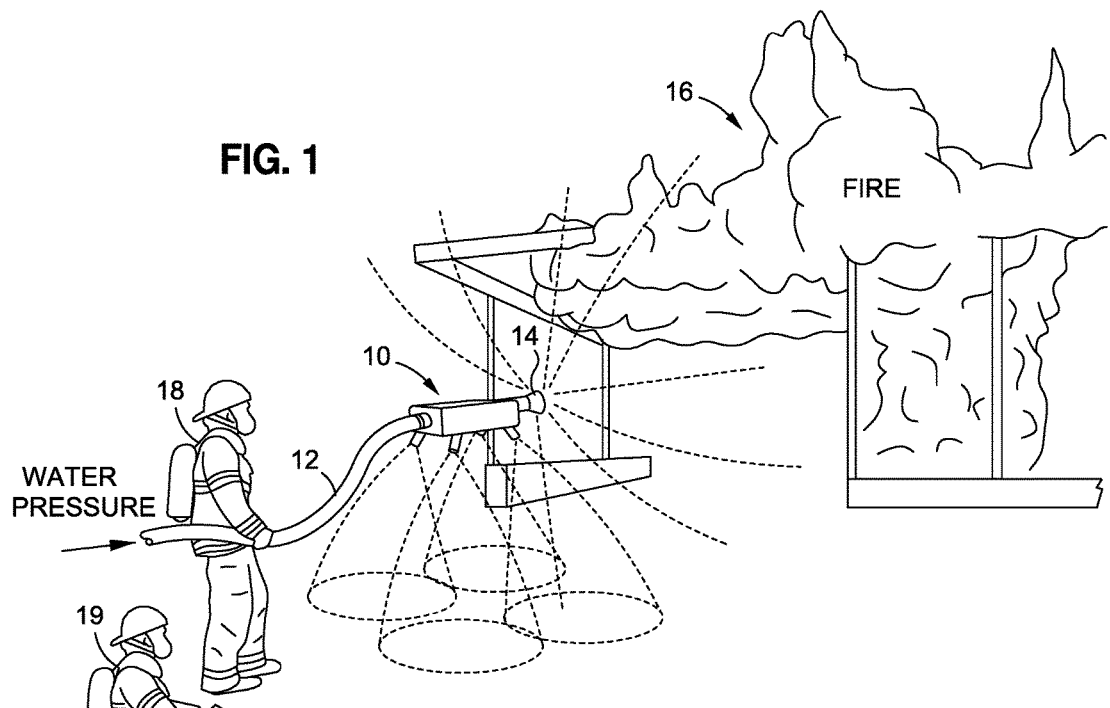
FIG. 1 is a perspective view showing the nozzle drone of the present invention in use at a the scene of a fire.

Turning now to the drawings, in which like numerals indicate corresponding elements throughout the several views, attention is first directed to FIG. 1, showing the nozzle drone of the present invention, indicated in its entirety by the numeral 10, being used to transport a fire hose 12 and primary nozzle 14 to the scene of a structure fire 16. The nozzle drone 10 allows firefighting fluid such as water, fire retardant foam, or a combination of fire retardant foam and water, to be delivered to the hottest and most hazardous area of the fire 16, while allowing firefighting personnel 18, 19 to remain a safe distance away from the collapse zone of the burning structure 20. Movement of the nozzle drone 10 and flow through the primary nozzle 14 is controlled by an operator 19 using a remote control handset 22.

The hose 14 may be any type of non-collapsible fire hose, such as a supply hose, relay hose, attack hose, booster hose, or forestry hose, and may be connected to a remote source such as a hydrant or pumper. Depending on the type used, the hose may have a length of 50 to 100 feet or longer, and a nominal inner diameter of 0.625 to 5.0 inches, and may operate at pressures from about 200 psi to 800 psi. The weight of a fully charged hose depends on its diameter and length; a 100 foot long, 5-inch I.D. large diameter hose could have a weight of up to about 700 pounds.

Figure 4:
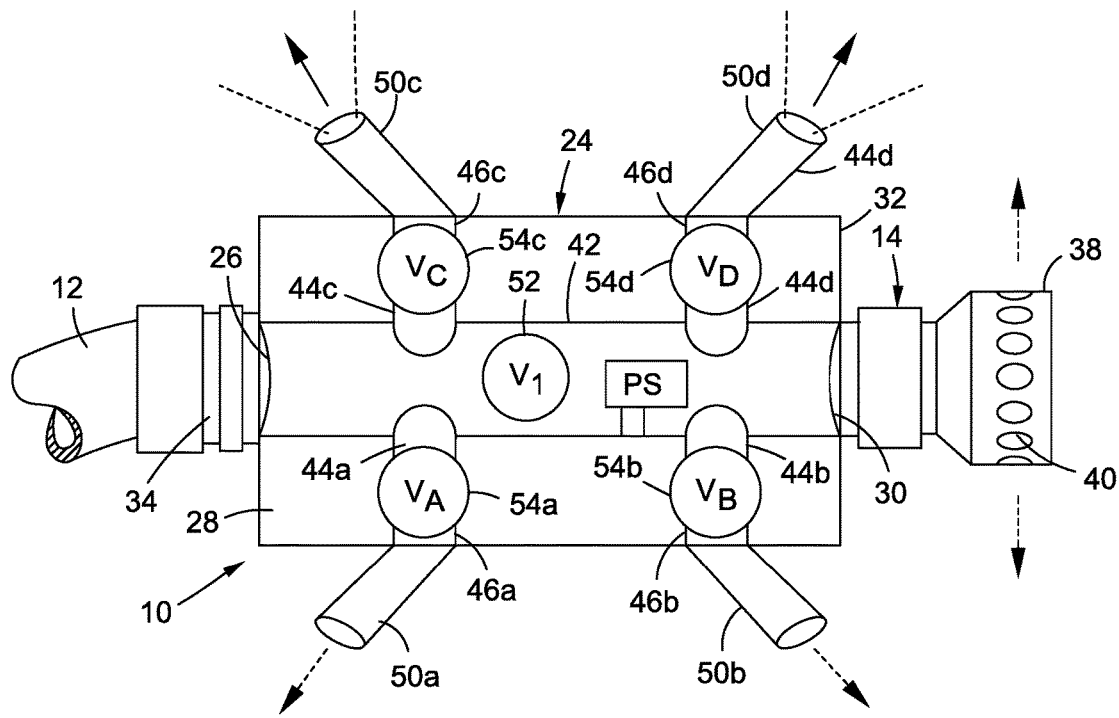
FIG. 4 is a schematic diagram of a horizontal cross section of the nozzle drone of FIG. 2.

Referring to FIG. 4, the nozzle drone 10 comprises a drone housing 24 formed from a sturdy, heat-resistant, and relatively lightweight material such as aluminum. A primary inlet opening 26 is provided at a first end 28 of the housing 24, and a primary outlet opening 30 is provided at an opposite end 32 of the housing 24. The primary inlet opening 26 may be internally threaded to mate with external threads at the distal end 34 of the fire hose 12, or alternate fastening arrangements may also be used to secure the hose end 34 to the primary inlet opening 26. A seal (not shown) may be used to prevent leakage between the hose end 34 and the primary inlet opening 26. In addition, an adapter (not shown) may be provided to allow hoses of different diameter to be coupled to the primary inlet opening 26.

Figure 5:
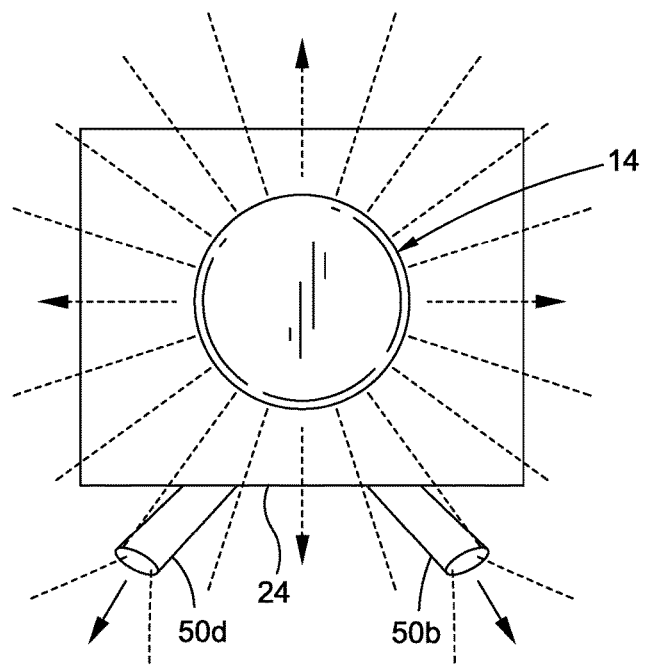
FIG. 5 is a front view of the nozzle drone.

The nozzle 14 is secured to the primary outlet opening 30 of the drone housing 24. The nozzle 14 may be integral with the drone housing 24, or it may be removably secured thereto. For instance, the proximal end of the nozzle 14 may be provided with external screw threads that mate with internal screw threads in the primary inlet opening 26, or alternate fastening arrangements may be used. A seal (not shown) may be used to prevent leakage between the primary outlet opening 30 and the nozzle 14. The nozzle 14 preferably has an annular surface 38 with spray openings 40 formed 360 degrees around its circumference, so that fluid is emitted in a radial direction, as shown in FIG. 5. The radial spray pattern produces force in every direction, resulting in a net force of zero, so that there is no recoil or reaction force exerted by the main nozzle 14 on the drone housing 24 and the connected hose 12.

A central passageway 42 extends through the drone housing 24 between the primary inlet opening 26 and the primary outlet opening 30, allowing fluid to flow between the hose 12 and the nozzle 14. A plurality of secondary flow passages, for instance four flow passages 44a, b, c, d, extend between the central passageway 42 and a plurality of secondary openings 46a, b, c, d formed in the bottom surface 48 of the drone housing 24. Each secondary opening 46a, b, c, d communicates with an associated lift nozzle 50a, b, c, d that extends downwardly from the bottom surface 48.

Each of the lift nozzles 50a, b, c, d may be tapered, and preferably has a small outlet diameter relative to the diameter of the fire hose 12 and of the main primary nozzle 14. For instance, each lift nozzle 50a, b, c, d may have a diameter at its inlet end of about 1 inch, and a diameter at the inlet end of 0.5 inches or less. At an operating pressure of 200 psi, a nozzle of this size would produce a force of approximately 75 pounds. Thus, a set of four nozzles of this size would produce a thrust of approximately 300 pounds. A larger number of nozzles would of course create a larger thrust and could be provided on drones intended for use with heavier hose.

Figure 2:
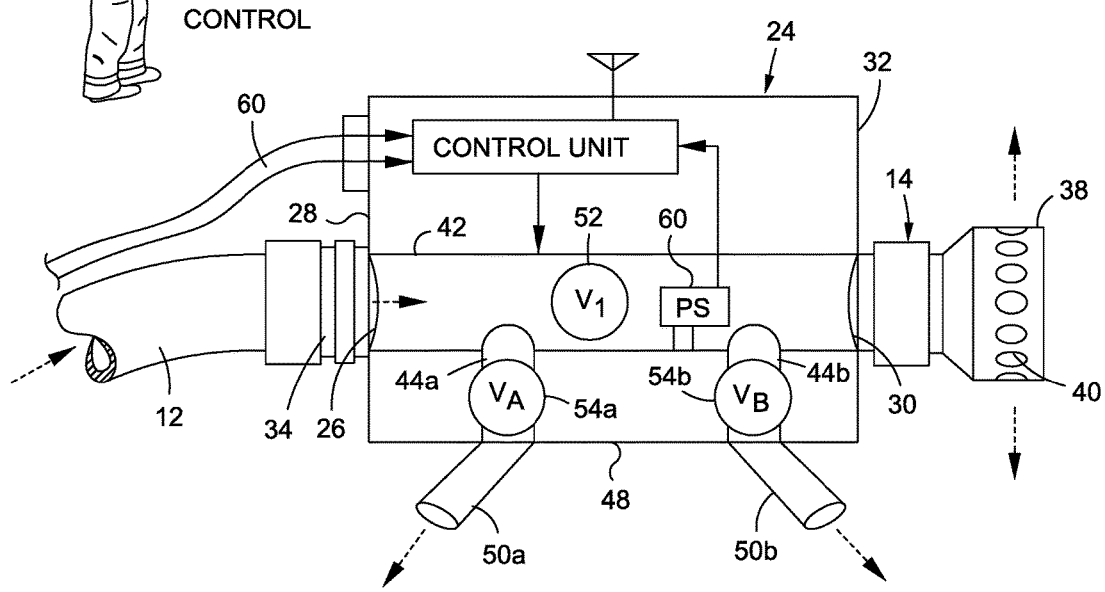
FIG. 2 is a schematic diagram of a vertical cross section of a nozzle drone according to an exemplary embodiment of the present invention.
Figure 3:
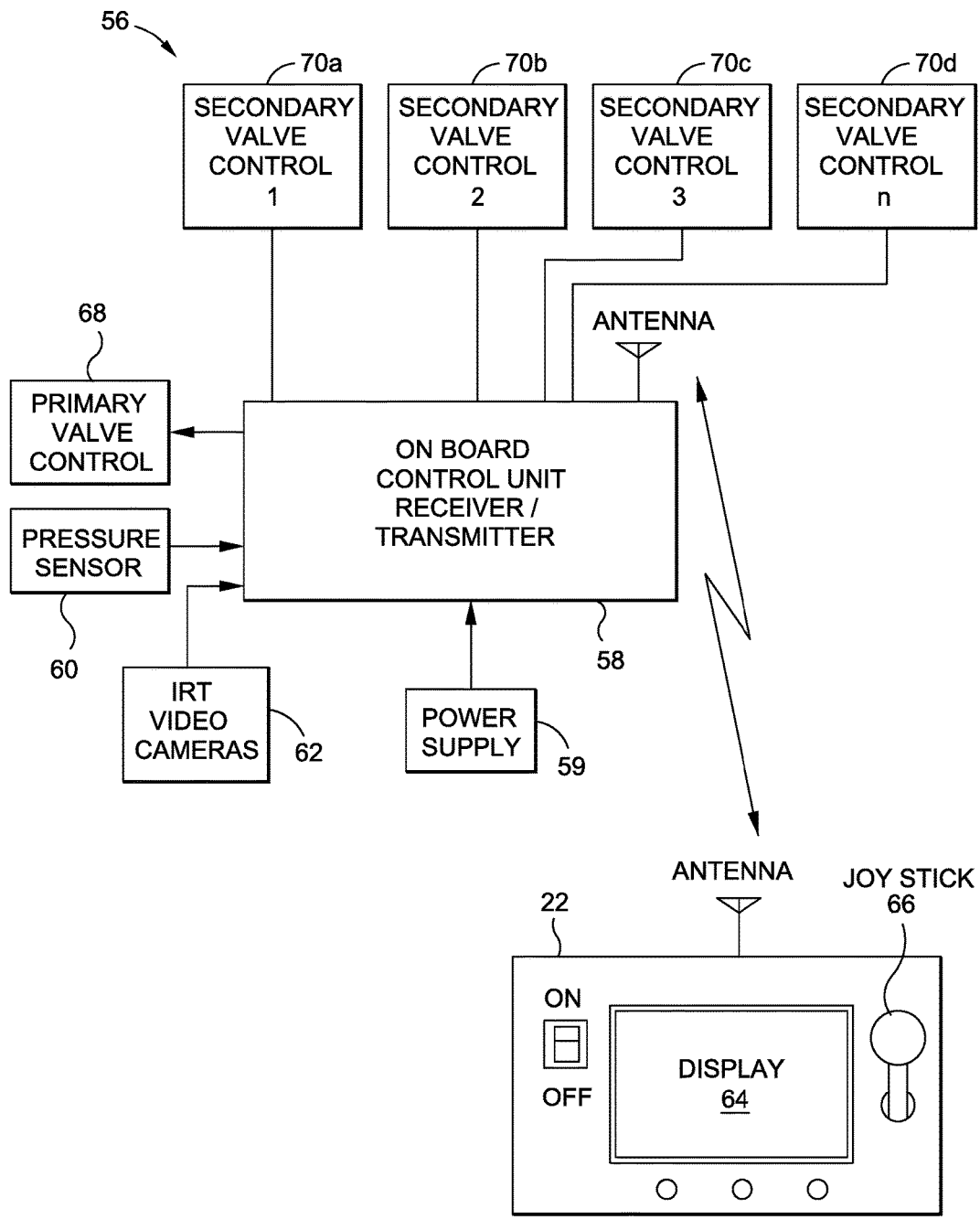
FIG. 3 is a block diagram of a control system for a nozzle drone according to an exemplary embodiment of the present invention.

In the embodiment of FIGS. 2-4, the lift nozzles are arranged in pairs, with a pair of rear nozzles lift 50a, 50c provided in a rear portion of the drone housing 24, and a pair of front lift nozzles 50b, 50d provided in a front portion of the drone housing 24. One rear lift nozzle 50a and one front lift nozzle 50b are provided in a right portion of the drone housing 24. The other rear lift nozzle 50c and the other front lift nozzle 50d are provided in a left portion of the drone housing. Each of the rear nozzles 50a, 50c may extend slightly rearwardly so as to produce thrust in a forward, as well as upward, direction and each of the front nozzles 50b, 50d may extend slightly forwardly so as to product thrust in a rearward, as well as upward, direction. Similarly, each of the right side nozzles 50a, 50b may extend slightly to the right so as to product thrust in a slightly leftward, as well as upward, direction and each of the left side nozzles 50c, 50d may extend slightly to the left so as to produce thrust in a slightly rightward, as well as upward, direction. The jet nozzles 50a, b, c, d are illustrated here as having fixed positions. However, they could also be mounted for swiveling, rotating, or pivoting movement, and controls could be provided to change their angular orientation for more effective steering control of the nozzle drone's motion.

A primary valve 52 is provided in the central passageway 42 for controlling the flow of fluid into the primary nozzle 14. Secondary valves 54a, b, c, d are provided in the secondary passageways 44a, b, c, d for controlling the flow of fluid into each of the lift nozzles 50a, b c, d.

A control system 56 for operating the primary nozzle 14 and each of the lift nozzles 50a, b, c, d is illustrated schematically in FIGS. 2 and 3. The control system 56 comprises an on-board control unit 58 that may receive and transmit radio signals to and from, or be hardwired to, the remote control handset 22. Power is delivered from a power supply 59 to the control unit 58 via a power cable 60 or battery (not shown). Preferably the power cable 60 is at least as long as the hose 12.

The control unit 58 receives input from a pressure sensor 60 located in the central passageway of the drone housing 24, as well as from an infrared camera or cameras 62, also mounted onboard. Data from the pressure sensor 60 and images from the cameras 62 is transmitted back to the handset 22 where it is displayed on a monitor 64 and assessed by an operator, who then manipulates a joy stick 66 to transmit control signals back to the control unit 58. These control signals are then output to a primary valve control 68 and secondary valve controls 70a, b, c, and d to control flow through the valves as needed.

In a typical scenario, the primary valve 52 and all of the secondary valves 54a, b, c, d would initially be closed while the drone 10 was in a rest position on the ground. An operator would then manipulate the joy stick 66 to open all of the secondary valves a, b, c, d to produce an upward thrust from the four lift nozzles 50a, b, c, d to propel the drone 10 into the air. The operator would then close the two front valves 54b and 54d, leaving the rear valves 54a and 54c open to produce a forward thrust, propelling the drone 10 forward, closer to the fire 16. If the drone 10 were to drift too far to the left, the operator could open both left side valves 50c and 50d, while closing both right side valves 50a and 50b, to produce a rightward thrust. Similarly, if the drone 10 were to drift too far to the right, the operator could correct its course by closing the two left side valves 50c and 50d, and opening the two right side valves 50a and 50b. Even more precise steering could be enabled by the addition of an on-board gyroscope (not shown).

The primary valve 52 could remain shut until the drone 10 actually reaches the fire, at which point the operator would open it, allowing spray to be emitted radially, 360 degrees around the nozzle, to extinguish, or aid in extinguishing the fire.

In operations requiring longer hoses, additional drones 10 may be used as auxiliary lifting units. In such cases, each unit would be individually controlled by a separate control system 56.

In another exemplary embodiment of the invention, illustrated in FIGS. 6-9, and indicated in its entirety by the number 210, the lift nozzles 250a, b, c, d may extend in a strictly downward direction. More specifically each lift nozzle 50a, b, c, d may be mounted at the distal end of a vertical pipe section 280a, b, c, d that extends downwardly at a right angle from a horizontal pipe section 282a, b, c, d that communicates at its proximal end with the central passageway 242 through the drone housing 224.

Horizontal movement of the drone 210 is controlled by a steering nozzle 284 rotatably mounted in a top surface 286 of the housing 224. The steering nozzle 284 may, for instance, be surrounded by an annular collar 286 having a plurality of gear teeth (not shown) formed along its outer circumference. The gear teeth may mesh with teeth on a gear 288 mounted on a rotatable shaft driven by a motor 290 within the drone housing.

Figure 6:
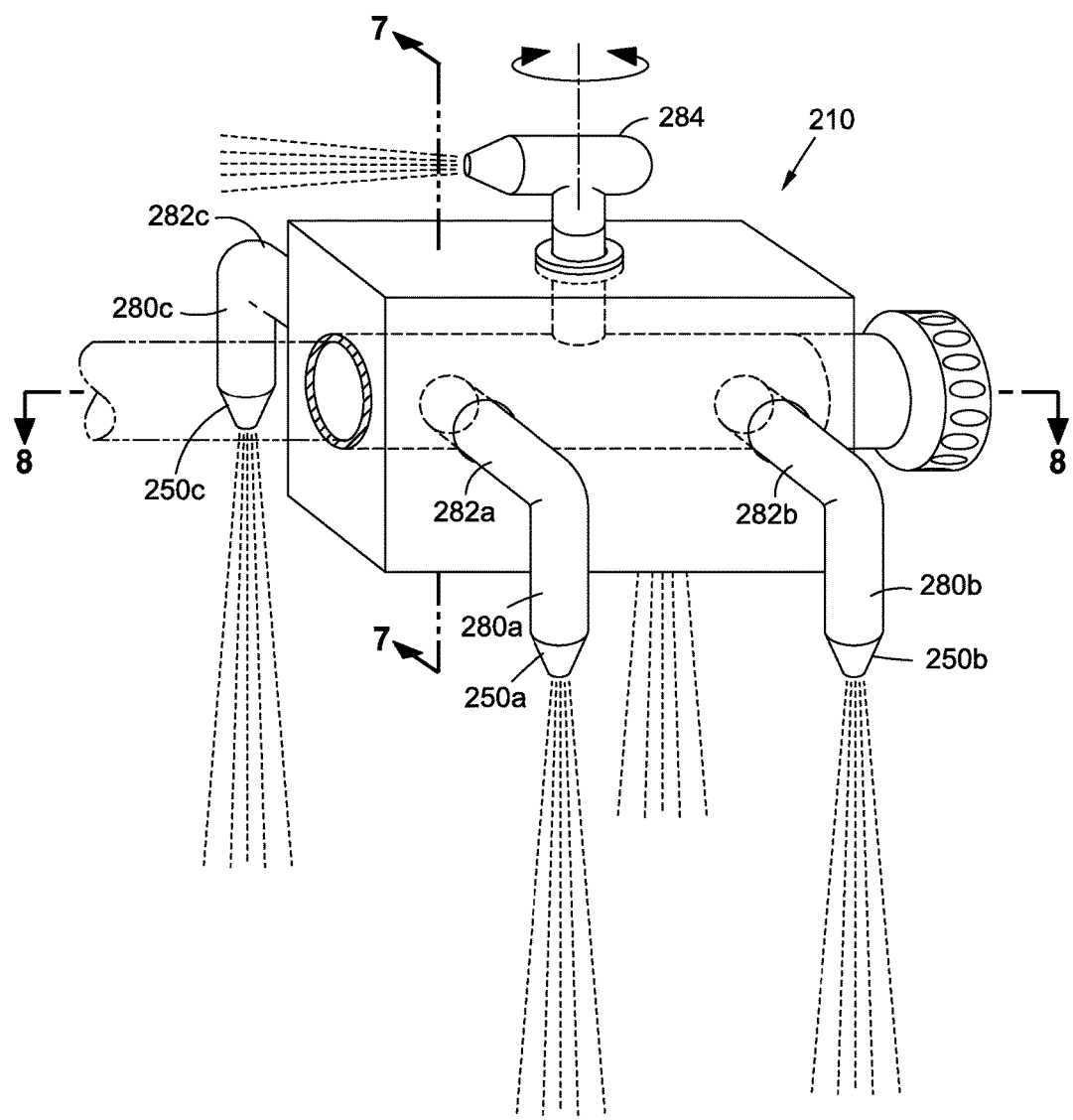
FIG. 6 is a perspective view of another exemplary embodiment of the invention.
Figure 7:
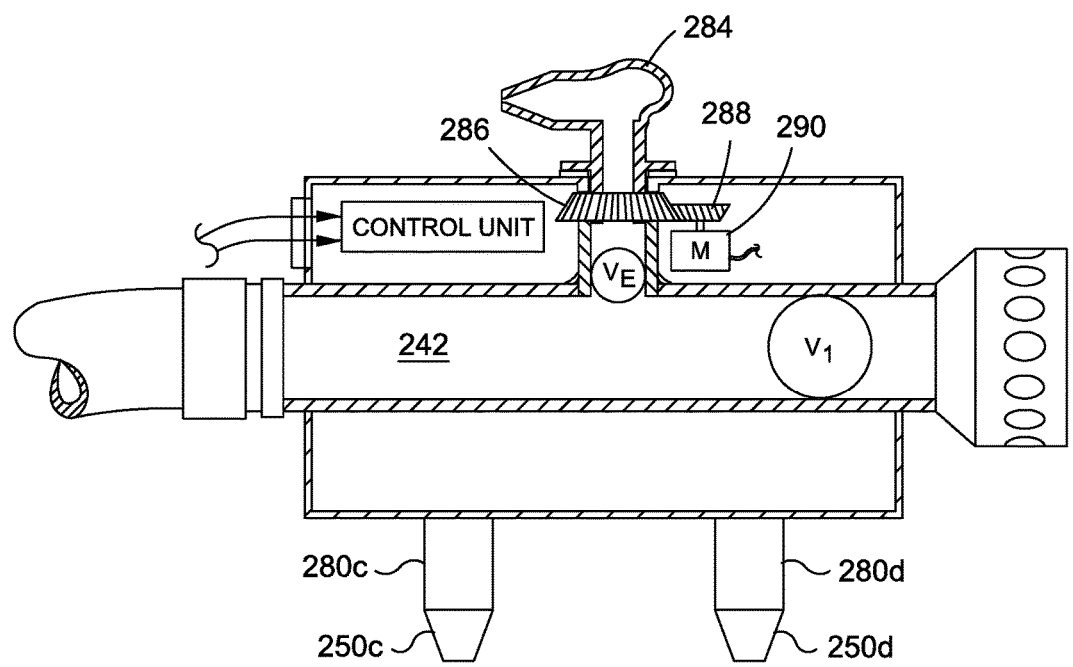
FIG. 7 is a sectional view taken through line 7-7 of FIG. 6.
Figure 8:
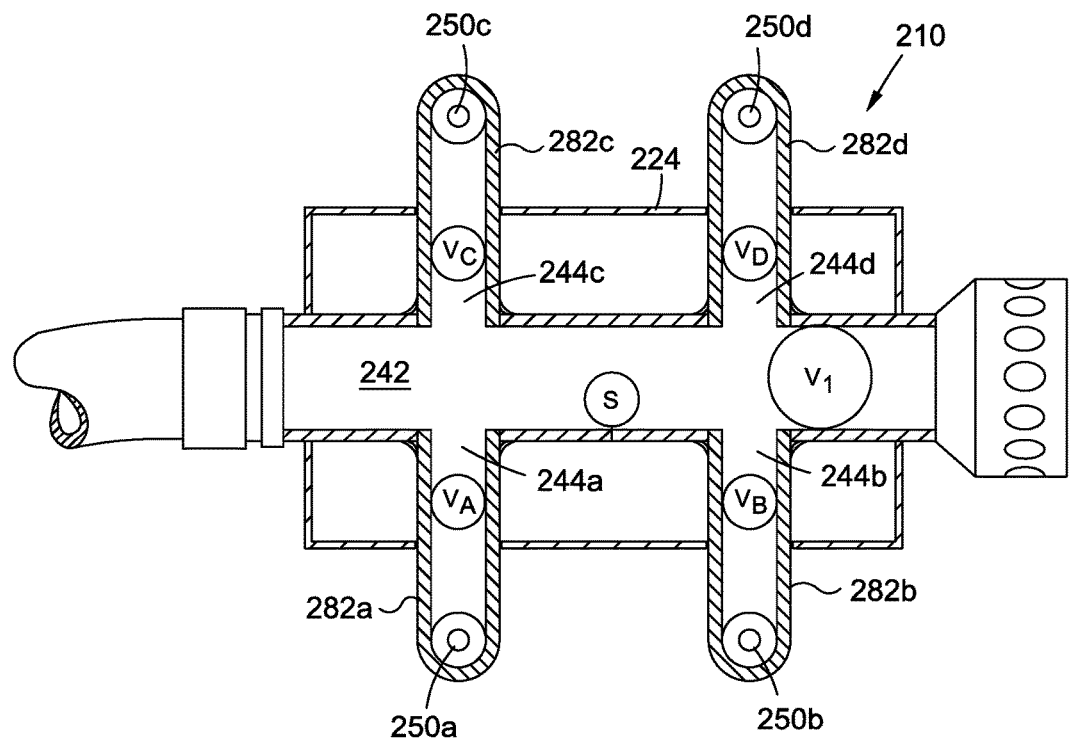
FIG. 8 is a sectional view taken through line 8-8 of FIG. 6.
Figure 9:
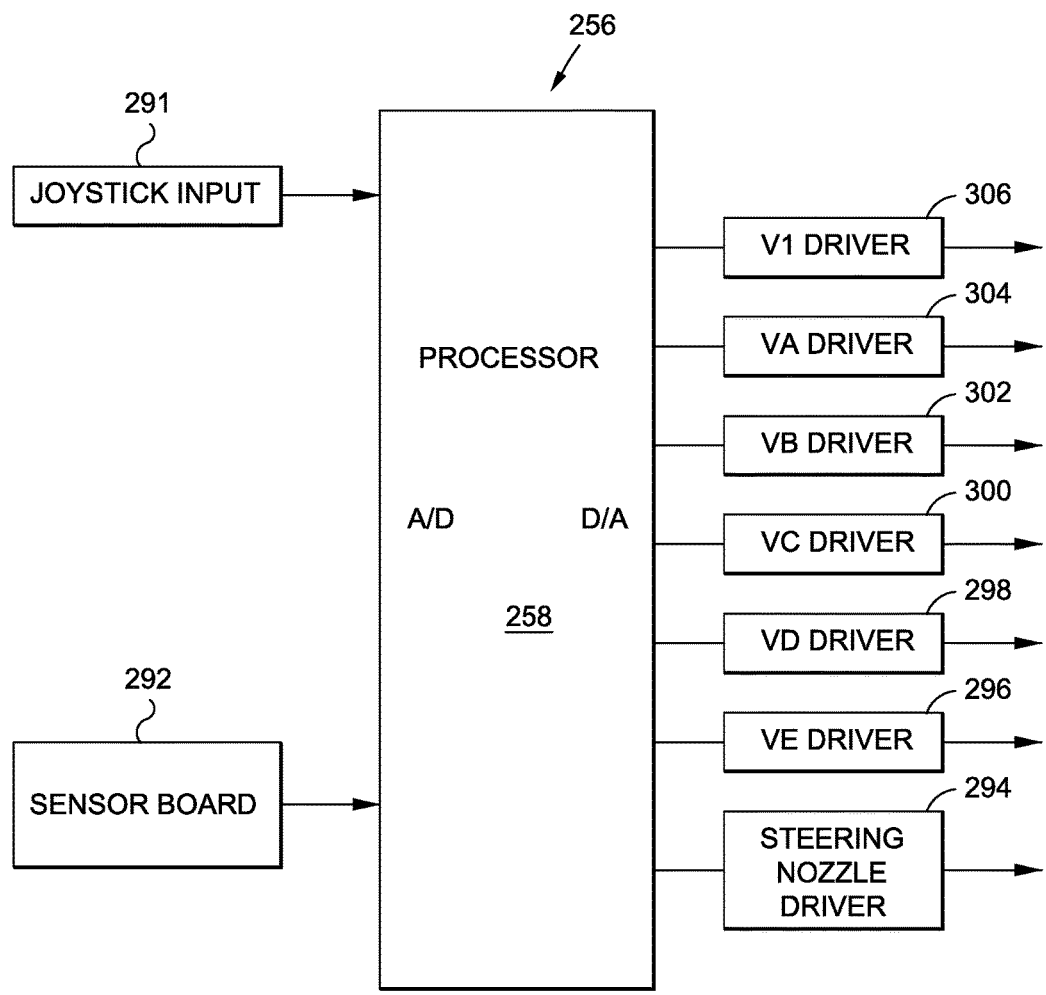
FIG. 9 is a block diagram of a control system according to the embodiment of FIGS. 6-9.

As shown in the block diagram of FIG. 9, an exemplary control system for the embodiment of FIGS. 6-8 comprises an on-board processor 258 that receives joystick input 291 from a remote control handset 22 (as shown in FIG. 3), as well as signals from a sensor board 292 mounted in the drone housing 224. The sensor board, which may be a commercially available board such as the ALTIMU-10V4 gyro-accelerometer, compass, and altimeter from Pololu Robotics and Electronics, includes a plurality of sensors including a gyro, pressure sensor, altimeter, position sensor, and other instruments for collecting data regarding the status of the drone and the fluid in the central passageway 242. Typically, the operator controls the basic horizontal direction of movement of the drone 210 by manipulating the joystick 66 to control output to the steering nozzle driver 294, while the operation of the valve drivers 296, 298, 300, 302, 304, and 306 is controlled automatically by the central processor in response to changes in pressure, position, and other parameters detected by the sensor board 292. This enables the drone to remain upright and maintain a relatively stable flight path, even in the face of sudden pressure changes or other unexpected events upstream of drone.

While the principles of the invention have now been made clear in the illustrated embodiment, there may be immediately obvious to those skilled in the art many modifications of structure, arrangements, proportions, elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

The invention claimed is:
1. A hydraulically propelled drone for delivering firefighting fluid, the drone comprising;
   a drone housing including
      a primary inlet configured to receive a distal end of a fire hose,
      a primary outlet coaxially aligned with the primary inlet,
      a straight central passageway configured to conduct fluid from said primary inlet to said primary outlet, and
      at least one secondary outlet communicating with said central passageway;
   a primary nozzle communicating with the primary outlet of the drone housing, the primary outlet having an outlet end configured to discharge said fluid;
   at least one lift nozzle communicating with said secondary outlet and configured to direct fluid in a downward direction to produce an upward thrust on the drone housing;
   a steering nozzle mounted for 360° rotation in said housing, said steering nozzle having an inlet communicating with said central passageway and an outlet end extending perpendicular to said inlet end and configured to direct said fluid in a horizontal direction to propel the drone in a direction opposite said horizontal direction; and
   at least one valve contained within the drone housing and configured to control the flow of said fluid through said primary nozzle, said at least one lift nozzle, and said steering nozzle.

2. The hydraulically propelled drone according to claim 1, wherein:
   said at least one lift nozzle comprises at least four lift nozzles, including at least a pair of front nozzles located in a front portion of said housing and at least a pair of rear nozzles located in a rear portion of said housing, each of said pairs including a left nozzle located on a left side of said housing and a right nozzle located on a right side of said housing.

3. The hydraulically propelled drone according to claim 1, wherein said at least one valve comprises:
   a primary valve configured to control flow through said primary nozzle; and
   at least one secondary valve configured to control flow through said at least one lift nozzle.

4. The hydraulically propelled drone according to claim 2, wherein said at least one valve comprises:

a primary valve configured to control flow through said primary nozzle; and at least four secondary valves, wherein each of said secondary valves is associated with a different one of said lift nozzles and configured to control flow through said associated one of said lift nozzles.

5. The hydraulically propelled drone according to claim 1, further comprising a remotely actuatable electronic control system configured to operate said at least one valve.

6. The hydraulically propelled drone according to claim 3, further comprising a remotely actuatable electronic control system configured to operate said primary valve and said at least one secondary valve independently of one another.

7. The hydraulically propelled drone according to claim 4, further comprising a remotely actuatable electronic control system configured to operate said primary valve and each of said secondary valves independently of one another.

8. A hydraulically propelled drone for delivering firefighting fluid to an above-ground location, the drone comprising:
a drone housing including
a primary inlet configured to receive a distal end of a fire hose,
a primary outlet coaxially aligned with the primary inlet and configured to communicate with a primary nozzle, and
a straight central passageway configured to conduct fluid from said primary inlet to said primary outlet;
at least one lift nozzle communicating with said central passageway and configured to direct said fluid in a downward direction to produce an upward thrust on the drone housing;
a steering nozzle having
an inlet end communicating with and extending perpendicular to said central passageway and
an outlet end extending perpendicular to said inlet end and configured to direct said fluid in a horizontal direction to propel the nozzle in a direction opposite said horizontal direction; and
at least one valve contained within the drone housing and configured to control the flow of said fluid through said primary nozzle, said at least one lift nozzle, and said steering nozzle.

9. The hydraulically propelled drone according to claim 1, wherein said at least one valve comprises:
a primary valve configured to control flow through said primary nozzle;
at least one secondary valve configured to control flow through said at least one lift nozzle; and
at least one steering valve configured to control flow through said at least one steering nozzle.

10. The hydraulically propelled drone according to claim 1, wherein said steering nozzle is mounted for rotation for 360° rotation about a longitudinal axis extending through the inlet end of said steering nozzle.

11. The hydraulically propelled drone according to claim 9 further comprising an electronic control system configured to actuate said primary, secondary, and steering valves and to control rotation of said steering nozzle.

12. The hydraulically propelled drone according to claim 11, wherein said electronic control system comprises a remote control unit allowing an operator to rotate said steering nozzle to control horizontal movement of said drone.

13. The hydraulically propelled drone according to claim 11, wherein said electronic control system is configured to actuate said primary and secondary valves to stabilize movement of said drone in response to changes in pressure and position detected by sensors mounted within said housing.

14. The hydraulically propelled drone according to claim 8, further comprising said primary nozzle, wherein said primary nozzle comprises an annular surface having a plurality of spray openings extending 360° along said surface.

15. The hydraulically propelled drone according to claim 8 wherein said at least one valve comprises:
a primary valve configured to control flow through said primary nozzle;
at least one secondary valve configured to control flow through said at least one lift nozzle; and
at least one steering valve configured to control flow through said steering nozzle.

16. The hydraulically propelled drone according to claim 15 wherein said steering nozzle is mounted for 360° rotation about a longitudinal axis extending through the inlet end of said steering nozzle.

17. The hydraulically propelled drone according to claim 15, further comprising an electronic control system configured to actuate said primary, secondary, and steering valves and to control rotation of said steering nozzle.

18. The hydraulically propelled drone according to claim 17, wherein said electronic control system comprises a remote control unit allowing an operator to rotate said steering nozzle to control horizontal movement of said drone.

19. The hydraulically propelled drone according to claim 17, wherein said electronic control system is configured to actuate said primary, secondary, and steering valves to stabilize movement of said drone in response to changes in pressure and position detected by sensors mounted within said housing.

20. A hydraulically propelled drone for delivering firefighting fluid to an above-ground location, the drone comprising:
a drone housing including
a primary inlet configured to receive a distal end of a fire hose,
a primary outlet coaxially aligned with the primary inlet, and
a straight central passageway connecting said primary inlet to said primary outlet;
a primary nozzle secured to, and coaxially aligned with, the primary outlet;
a plurality of lift nozzles mounted on the housing, each of the lift nozzles communicating with said central passageway and configured to direct fluid in a downward direction to produce an upward thrust on the drone housing;
a steering nozzle mounted for rotation relative said housing, the steering nozzle having
an inlet end intersecting said central passageway, and
an outlet end communicating with said inlet end and configured to direct fluid in a horizontal direction to propel the nozzle in a direction opposite said horizontal direction;
a primary valve configured to control flow through said primary nozzle;
a plurality of secondary valves configured to control flow through said lift nozzles;
a steering valve configured to control flow through the steering nozzle;

a motor coupled to said steering nozzle and configured to rotate said steering nozzle about a longitudinal axis extending through the inlet end of the steering nozzle; and an electronic control system configured to actuate said motor and said primary, secondary, and steering valves to control rotation of said steering nozzle.

* * * * *